(12) United States Patent
Ratcliff et al.

(10) Patent No.: US 7,977,259 B2
(45) Date of Patent: Jul. 12, 2011

(54) ROOFING UNDERLAYMENT AND METHOD OF PRODUCING SAME

(76) Inventors: Steve A. Ratcliff, Pulaski County, AR (US); Shaik Mohseen, Williamson County, TX (US)

(*) Notice: Subject to any disclaimer, the term of this patent is extended or adjusted under 35 U.S.C. 154(b) by 133 days.

(21) Appl. No.: 12/207,688

(22) Filed: Sep. 10, 2008

(65) Prior Publication Data

US 2009/0011675 A1 Jan. 8, 2009

Related U.S. Application Data

(63) Continuation of application No. 11/786,187, filed on Apr. 11, 2007, now abandoned.

(51) Int. Cl.
*B32B 5/02* (2006.01)
*B32B 27/00* (2006.01)

(52) U.S. Cl. ........... 442/67; 442/64; 442/65; 442/66; 428/340; 428/352

(58) Field of Classification Search .......... 442/97, 442/164, 64–67; 428/340, 352
See application file for complete search history.

(56) References Cited

U.S. PATENT DOCUMENTS

| 4,588,634 A * | 5/1986 | Pagen et al. ........ 442/90 |
| 6,207,593 B1 * | 3/2001 | Fields ........ 442/86 |
| 2006/0228962 A1 * | 10/2006 | Souther et al. ........ 442/79 |

* cited by examiner

*Primary Examiner* — Lynda Salvatore
(74) *Attorney, Agent, or Firm* — Browning Bushman P.C.

(57) ABSTRACT

A roofing membrane suitable for use as an underlayment comprising a flexible, non-woven mat of polymeric fibers which are substantially uniformly dispersed throughout the non-woven mat and thermally bonded together at the points of intersection by the polymeric materials of the fibers, the mat having a top side and a bottom side, a layer of an asphaltic material being disposed on the bottom side of the mat to provide a coated mat and a liquid parting agent applied to the top side of the mat.

12 Claims, 4 Drawing Sheets

ROOFING UNDERLAYMENT AND METHOD OF PRODUCING SAME

CROSS REFERENCE TO RELATED APPLICATIONS

This application is a continuation of U.S. patent application Ser. No. 11/786,187, filed on Apr. 11, 2007, now abandoned, for Roofing Underlayment and Method of Producing Same, the disclosure of which is incorporated herein by reference.

BACKGROUND OF THE INVENTION

1. Field of the Invention

This invention relates to roofing products, or sheet-type roll roofing, used to seal substrate structures and the process for making the same. More particularly, the present invention is in the field of roofing underlayments commonly used in residential and commercial applications.

2. Description of Prior Art

Underlayment materials are widely used in roofing applications. They are commonly used under asphaltic shingles, shakes, slate, cedar, tile, and metal panels in addition to being used in build-up roofing (BUR) and modified bituminous roofing applications. The primary objective of using an underlayment in residential application is to provide a secondary water barrier on the roof. Underlayment is also used as a barrier on the deck when applying roofing membranes by various application methods such as torching or hot mopping. These are also used in applications of self-adhering membranes when the building codes prohibit direct adhesion to wood substrates. Underlayments are typically fastened to the roof deck using roofing nails or staples.

These products have continued to evolve over the years. In the early part of the $20^{th}$ century, asbestos fiber based roofing felts were used; however these are not used anymore due to health hazards associated with asbestos. For several decades, underlayment products have been manufactured using organic felts. These materials are commonly referred to as No. 15 and No. 30 felts. These are manufactured by coating organic felt (a. k. a. paper) with asphalt, and are relatively inexpensive materials.

However felts have several limitations. They have poor tensile strength, which causes felt to tear easily resulting from foot traffic during the installation process. Once installed, felts also tear easily due to wind. When exposed to the elements, felts experience thermal expansion and contraction, which leads to wrinkles and fishmouths. Moreover, when left exposed, they deteriorate with time. Availability of felt fluctuates greatly, especially when the demand increases dramatically after weather-related events such as hurricanes. Also the price of felt is greatly dependent upon crude oil price. These uncertainties, coupled with the disadvantages of felt, have led to the development of alternate materials.

In early 2000s, synthetic underlayments were introduced in the market. These non-asphaltic materials are based on plastics such as polyethylene and polypropylene. Most synthetic underlayments are manufactured by laminating two or more layers of polymeric films or fabrics. These products have gained popularity due to several inherent advantages over felt. Some of the main benefits: lightweight, more coverage per roll, lays flat, wrinkle-free, excellent tensile and tear strength, superior resistance to UV light, resistance to algae, fungi and mold, resistance to rot and decay, etc. Though higher priced than felts, synthetic underlayments have been gaining market share due to their advantages over felt.

However synthetics do have several disadvantages. For one, they have no long term proven performance as roofing underlayments. Almost all synthetic underlayments are laminants of two or more polymeric sheets that are thermally or chemically bonded together. Since they are laminates, there is a strong possibility of delamination of the component layers when exposed to the elements after installation. Also, most synthetics do wrinkle when exposed to sunlight. Another disadvantage is that these products do not seal around fasteners; therefore only certain types of fasteners are permitted to be used with synthetic underlayments. Most synthetics have poor traction, i. e., these sheets are slippery at higher slopes, particularly under wet conditions.

Another type of underlayments used is generally referred to as 'base sheets'; these are widely used in commercial roofing applications. Base sheets are polyester or fiberglass reinforced materials that are saturated and coated with an asphaltic material or modified asphaltic material, and surfaced with parting agents such as sand, talc or fine mineral aggregate. The modified asphaltic material could be an atactic polypropylene (APP) or Styrene-Butadiene-Styrene (SBS) based formulation.

SUMMARY OF THE INVENTION

The underlayment of the present invention is a hybrid roofing underlayment manufactured via the traditional "asphalt coating process", which eliminates the possibility of any delamination.

In one aspect, the present invention provides a roofing underlayment generally of the roll type, comprising a polymeric core having a top side and a bottom side, the bottom side being coated with a coating asphalt. Further the top side and the exposed surface of the asphaltic material can be treated with an anti-sticking agent such as a liquid parting agent.

In another aspect, the present invention provides a roofing material, generally of the roll type, comprising a polymeric core having a top side and a bottom side, the bottom side being coated with an asphalt saturant. The top side and the exposed surface of the asphaltic saturant can be treated with an anti-sticking agent such as a liquid parting agent.

In yet another aspect, the present invention provides a roofing material, generally of roll type, comprising a polymeric core having a top side and a bottom side, the bottom side being coated with an asphalt flux. The top side and the exposed surface of the asphaltic flux coating can be treated with an anti-sticking agent such as a liquid parting agent.

A further aspect of the present invention is a roofing material, generally of roll type, comprising a polymeric core having a top side and a bottom side, the bottom side being coated with a mixture of saturant asphalt, blown coating asphalt, and asphalt flux. The top side and the exposed surface of the asphaltic material can be treated with an anti-sticking agent such as a liquid parting agent (LPA).

Still another aspect of the present invention is a roofing material, generally of the roll type, comprising a polymeric core having a top side and a bottom side, the bottom side being coated with a modified asphaltic material. The top side and the exposed surface of the modified asphaltic material can be treated with an anti-sticking agent such as liquid parting agent.

In another aspect of the present invention there is provided a method of manufacturing a roofing underlayment material comprising coating a polymeric mat with an asphaltic material on one side of the said mat, and applying a liquid parting agent to the other, exposed side of the mat.

Still a further aspect of the present invention is to provide an underlayment comprised of a non-woven core or mat, e.g., a non-woven polyester mat, which has a bituminous coating and which is lightweight.

The foregoing description and examples illustrate selected embodiments of the present invention. Further aspects, embodiments, features and advantages of the present invention will become apparent to those of ordinary skill in the art upon reading and understanding the following detailed description, the drawing and the claims.

DETAILED DESCRIPTION OF THE PREFERRED EMBODIMENT

Figure 1:
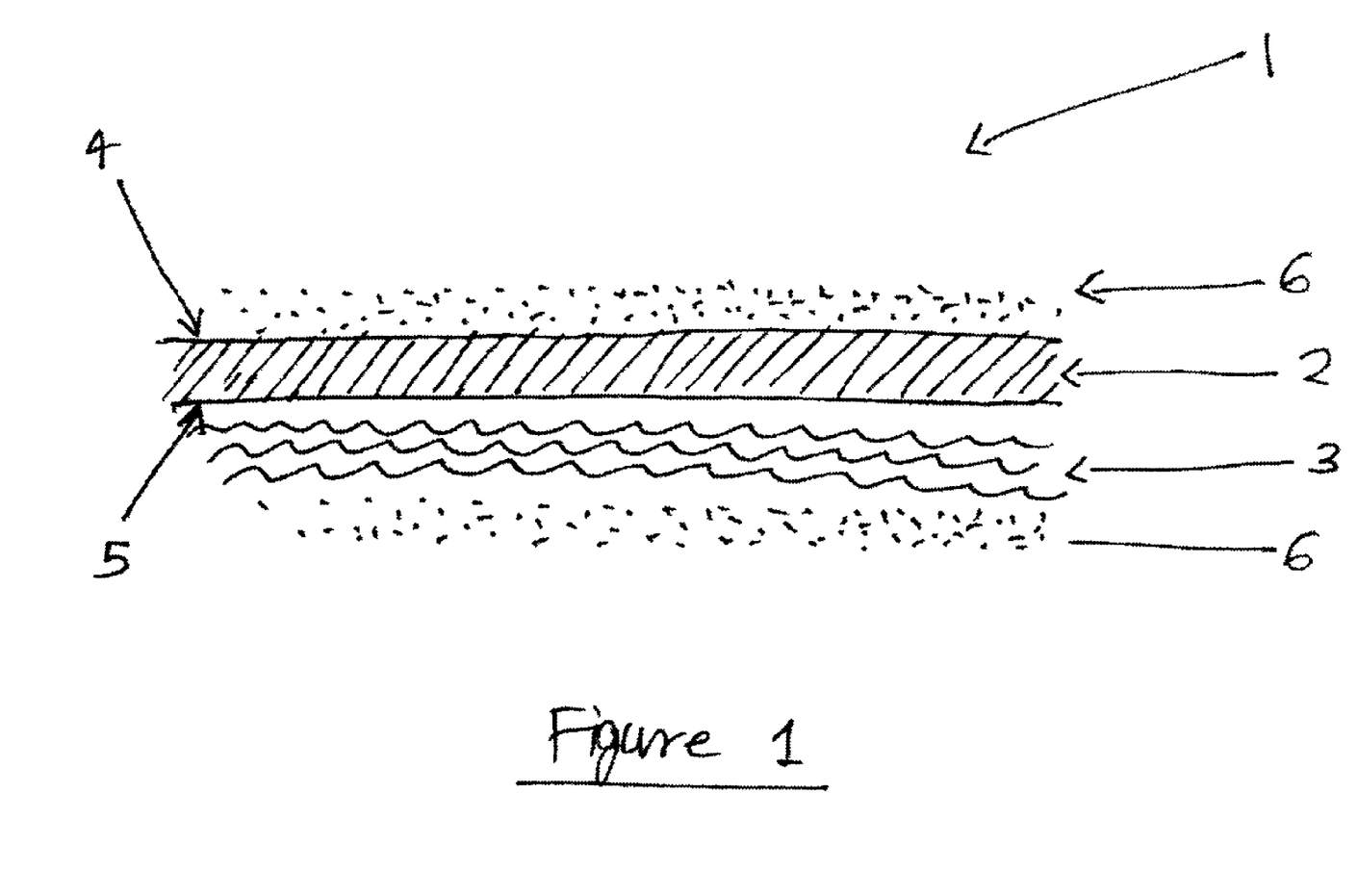
FIG. 1 is a cross-sectional view of one embodiment of the roofing underlayment material of the present invention.

Referring to FIG. 1, there is shown a cross-sectional view of one embodiment of the roofing underlayment made in accordance with the present invention. The roofing underlayment shown generally as 1 comprises a flexible, non-woven mat 2 of polymeric fibers, the polymeric fibers being substantially uniformly dispersed throughout the nonwoven mat and being thermally bonded together at their points of intersection by polymeric material of the fibers, which has been coated with a layer 3 of an asphaltic material described hereafter. The carrier or mat 2 has a top side 4 and a bottom side 5. The layer 3 of the asphaltic material is disposed on the bottom side 5 of the mat 2. A second layer 6 of an anti-sticking agent, especially as LPA, described hereafter, is disposed on the exposed surface of the asphaltic material 3 and, optionally, on the top side 4 of mat 2.

The mat 2 can be made of polyester commonly used in the manufacture of roofing materials. This can be spunbond polyester or staple fibers and can be made from either virgin polyester or recycled materials, the latter being preferred from an economic standpoint. The base weight of polyester can range from 50 grams per square meter to 250 grams per square meter depending upon the desired end use, a base weight of 100 to 110 grams per square meter being preferred. A preferred mat or mat 2 is made of a non-woven polyester mat, weighing 100 to 110 grams per square meter. The polyester employed can be reinforced internally with fiberglass yarns to offer ease of processing and improve dimensional stability of the final product.

As noted above, the mat 2 of the present invention is coated with an asphaltic material. Asphaltic materials suitable for use in producing the roofing product of the present invention may be derived from petroleum, coal or other sources, asphaltic materials derived from petroleum distillation being preferred. The asphaltic material may be (1) a single type of asphalt, (2) a combination of two or more types of asphalt, (3) a polymer modified asphalt or (4) a polymer modified asphalt together with one or more unmodified asphalts.

One type of asphalt is material which can be used is 'blown coating' asphalt, which is obtained by the oxidation of asphalt flux in order to increase the hardness and softening point values. Generally, such blown coating asphalt will have a softening point of between about 50 and about 130° C. as measured by ASTM D 36 test method, more preferably between about 90 and about 115 C., and a needle penetration of between about 10 and 70 dmm, as measured by ASTM D 5 test method, more preferably between about 25 and 55 dmm. Blown coating asphalt imparts rigidity to the final product. However this rigidity can lead to cracking when the coated roll is unrolled at low temperatures. Depending upon the severity of the cracking, this can either be an aesthetic or a functional issue affecting product performance. To overcome this low temperature, cracking problem, the asphaltic material employed can be a saturant asphalt.

Saturant asphalts having softening points, as measured by ASTM D 36 test method of between about 30 and about 60° C., more preferably between about 35 and about 45° C., and a needle penetration as measured by ASTM D 5 test method of between about 60 and 150 dmm, more preferably between about 80 and 130 dmm. While a product made with a saturant asphalt is less prone to cold cracking, roofs of such products are prone to a condition referred to as 'blocking' at high temperatures. 'Blocking' is a condition of the roll where the concentric layers of the roll stick together, preventing the roll from being unrolled without tearing.

As an alternative to saturant asphalt one can use unoxidized asphalt flux such as a roofing asphalt flux. Such an asphalt flux is sold under the name of 180 Pen asphalt, with a softening point of from 30 to 60 C. and a needle penetration value from 140 to 200 dmm.

To overcome the low temperature cracking problem and the blocking problem, one can use a mixture of the blown coating asphalt, saturant asphalt, and asphalt flux, in varying proportions.

Additionally a modified asphalt coating can be used to coat the mat 2. Such asphalt coating could be modified with a polymeric modifier such as an Atactic Polypropylene (APP), Amorphous Poly Alpha Olefin (APAO), Thermoplastic Polyolefin (TPO), Styrene-Butadiene-Styrene (SBS), Styrene-Ethylene-Butadiene-Styrene (SEBS), Styrene-Isoprene-Styrene (SIS), Ethylene Propylene Diene Monomer (EPDM), Ethylene Propylene Rubber (EPR), synthetic rubber, etc. A preferred asphaltic modifier is (SBS) elastomer. SBS has the ability to impart low temperature flexibility to asphalt, is readily available, is relatively low cost, and is relatively easy to process. An example of an SBS polymer that may be used in the composition is sold by LCYIC of Houston, Tex. under the trade designation 3411B. Other manufacturers of SBS polymers are Kraton Polymers of Houston, Tex., Dynasol of Mexico, and LG Chemicals of Seoul, South Korea. A typical SBS modified coating formulation will typically comprise from 0.5 to 5% by weight of SBS, with a preferred range of 1 to 3% by weight SBS. Though higher in cost compared to blown coating or saturants, SBS modified bituminous coating provides the desired properties to the final product.

As can be seen from the above, the asphaltic material used to form a coating on the mat can take many forms. Ideally, a formulation of asphaltic material, whether it be modified or unmodified, will be of a type which overcomes low temperature cracking, prevents blocking and minimizes the weight of the coated, non-woven mat, whether the mat be made of polyester or some other polymeric material.

Asphaltic material 3 may contain between about 20 to about 65% by weight, preferably between about 35 to about 60% by weight of a mineral stabilizer or filler. Addition of mineral stabilizers helps reduce cost of the asphaltic material and improves fire resistant properties. The mineral stabilizer should be of the type commonly used in filled asphaltic materials and may be derived from limestone, stone dust, sand, fly ash, talc, volcanic ash, graphite, carbon black, silica or china clay, and other sources of suitable fine aggregate. Additionally, in lieu of at least a portion of the mineral stabilizers, fire retardant materials may be employed in order to achieve fire ratings as classified by Underwriters Laboratories (UL). Non-limiting examples of such fire retardants include calcium borate, magnesium borate, a mixture of antimony trioxide and decabromodiphenyl oxide, etc. When employed, the fire retardant material will be present in an amount of 5 to 35% by weight, i.e., the amounts specified above for the mineral stabilizer would include a minimum of about 5% by weight of the fire retardant materials when the latter is used. Thus, by way of example, when 10% by weight of a fire retardant was employed, the preferred amount of mineral stabilizer would be about from 20 to about 55% by weight. Limestone is a preferred filler because of its excellent compatibility with asphalt, ready availability, low cost, and ease of processing.

Compositions of asphaltic materials, including fillers, which can be employed comprise 2 to 18% by weight of a saturant asphalt, 40 to 58% by weight of a blown coating asphalt, 0.5 to 5% by weight of a Styrene-Butadiene-Styrene elastomer, and 20 to 60% by weight of a filler.

The coated mat 2, as noted above, is treated with an anti-sticking or parting agent 6 to keep the layers of the roll from sticking together. Commonly used anti-sticking agents are sand, limestone, talc, very fine granules, coal slag, polyolefinic films, non-woven fabrics, LPA, etc. A preferred anti-sticking material is LPA. LPA is a surfactant that is sprayed on the top side of the mat 2 and the exposed surface of the asphaltic material 3 during the manufacturing process. There are several advantages in using LPA as the parting agent instead of the other materials listed above. LPA is easy to apply to the sheet during the manufacturing process and is user friendly. It does not have the potential health hazards associated with finely divided solids, e.g., sand. It is readily available and is very inexpensive. It also has several functional advantages. One of the primary advantages of LPA is that it adds negligible weight to the finished roll. Whereas it takes approximately 8 lbs of sand to cover 100 square feet of surface area of the mat 2, it takes less than 0.5 lbs of LPA on a corresponding surface area of mat. Lower roll weight allows more products to be shipped on a truck, thereby reducing shipping cost per each roll. One supplier of LPA's is Griffin Brothers Inc. of Oregon.

Figure 2:
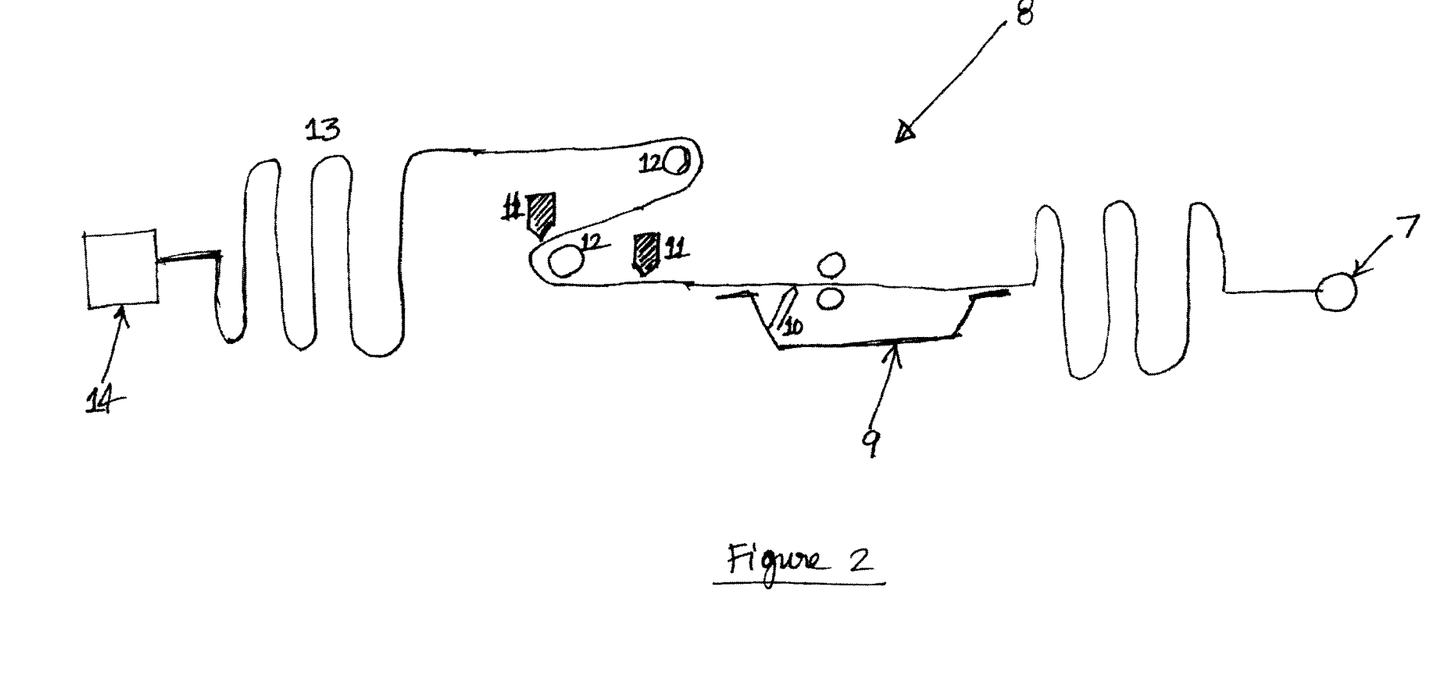
FIG. 2 is a simplified schematic view of one process of manufacturing a roofing underlayment material of the present invention.

FIG. 2 shows a simplified schematic of a process for manufacturing of the roofing underlayment of the present invention. During the process of manufacturing the roofing underlayment of the present invention, a roll of polymeric, e.g., polyester, mat 2 is unwound from an unwind stand 7 at one end of the production line 8 and travels in the direction of arrow A. The mat 2 moves through a coating station 9 wherein a layer of an asphaltic material 3 is applied to the bottom side 5 of the mat 2. Using doctoring blades 10, the asphaltic material 3 is scraped off so as to minimize the thickness of the layer of same on the mat 2. Next an LPA from a source 11 is sprayed on the top side 4 of the mat 2 and on the exposed surface of the layer of asphaltic material 3 that is disposed on the bottom side of the mat 2. Between the application of the LPA on the bottom side 5 and the top side 4, optionally the mat 2 can be run through a station where other types of parting agents or anti-sticking agents such as sand or talc or slag can be applied to the exposed surface of the asphaltic material 3 on the bottom side 5 of the mat 2. The mat 2 moves over chilled drums 12 in order to be cooled. The mat 2 continues to travel through the accumulator section 13 of the production line where it continues to cool by air-cooling. The material is cut to the required length and wound into rolls at the winder 14. Rolls are stacked on pallets and stored in the warehouse for shipment.

Typically, the layer of asphaltic material 3 which is disposed on the bottom side of the polyester mat 2 constitutes between about 2.5 to about 7.5 lbs., more preferably, between about 3.75 and 6.25 lbs, of asphaltic material per 100 square feet of surface area of the mat 2. The finished sheet 1 is typically 36 inches in width and 400 feet in length. Preferably, the material will also have the following characteristics: minimum tensile strength of 40 lbf per inch and 20 lbf per inch in the longitudinal and transversal directions, respectively, when tested according to ASTM D 1970 specification, water vapor transmission value of approximately 0.10 perms when tested according to ASTM E 96 test method; retain at least 80% of its original strength after accelerated heat aged testing; retain at least 80% of its original strength after 90 days accelerated UV exposure testing; pass liquid water transmission test when tested using both staples as well as standard roofing cap nails according to ASTM D 4869 test method; unroll at high temperatures without sticking within the roll, i.e., no blocking; does not exhibit any cracking under low temperature conditions, and, achieves Class A fire rating when tested to the requirements of Underwriters' Laboratories E 108 test method fire testing parameters.

The hybrid underlayment of this invention has several unique design features that facilitate its use as an underlayment for asphaltic shingles, shakes, slate, cedar, tile, and roofing in addition to being used in built-up roofing (BUR) and modified bituminous roofing applications. The product has numerous desirable properties such as: lightweight, easy to handle, provides more coverage per roll than typical prior art underlayments, high tensile strength, good tear strength, excellent puncture resistance, and exceptional dimensional stability, is skid-resistant, exhibits excellent water shedding properties, lays flat, is wrinkle free, rot and insect resistant, algae, mold and fungi resistant, pliable and flexible at low temperatures, useable in hot and cold climatic conditions, has high nail pull-thru' resistance, superior UV resistance, and high wind uplift resistance. The product will not delaminate like many synthetics, offers good water shedding properties, and is significantly more durable than synthetics and felt. Since the asphaltic material seals around fasteners, this material allows use of any type of fasteners to secure the sheet without jeopardizing the integrity of the material.

EXAMPLE 1

A mat of non-woven polyester having a net mass per unit area of approximately 100 grams per square meter was coated with an asphaltic material having a softening point of approximately 110 degrees and comprised of 9% by weight of saturant asphalt, 49.8% by weight of blown coating asphalt, 1.2% by weight of Styrene-Butadiene-Styrene elastomer, and 40% by weight of limestone filler. Excess asphaltic material was scraped off to leave a minimal amount of asphaltic material on the mat. Following this application, an LPA, Anti-Tak 40, was applied to the top surface of the polyester mat and to the exposed surface of the layer of asphaltic material. The coated mat had a net mass per unit area of about 10.5 lbs. per 100 square feet. The top side of the mat was left untreated, i.e., uncoated with asphaltic material, during the production process. It was found that the roofing material made as described above, formed an excellent underlayment when used in roofing applications.

Another embodiment of the present invention is a polyester-coated roofing underlayment that has a factory-applied self-adhesive coating at the side lap on the upper surface to achieve an immediate watertight bond after field installation. It is a recognized that the lap joints are the weakest points on any roofing system. When roofing underlayments are installed in the field, usually by mechanical fastening, one course of the underlayment is applied to the roof deck and adjacent courses are installed by overlapping in offset pattern, longitudinally (length wise) and transversally (width wise). Laps thus formed are not necessary watertight since water can enter through the seams. This is typical of any and all mechanically installed underlayment materials. In order to solve this problem and offer a mechanically attachable underlayment with a watertight seal, a pressure sensitive adhesive coating is applied longitudinally, along the edge of the sheet. The adhesive coating is protected by a siliconized release liner that is removed prior to installation of the material.

During installation of the underlayment, a first course of the material is mechanically fastened to the roof deck and a second course is placed over the first course in offset fashion such that the asphaltic material on the bottom side of the second course comes in contact with the adhesive coating on the side lap of the first course of underlayment. With the presence of the factory-applied asphaltic adhesive coating layer, all that the roofer has to do is remove the protective siliconized release liner on the first course of underlayment and align the second course of underlayment over the now-exposed adhesive layer on the side lap of the first course of underlayment, and then apply pressure to bond the two layers together. Such a contact between the two surfaces results in an instant, bond that is strong and watertight, even under low temperature conditions.

Figure 3:
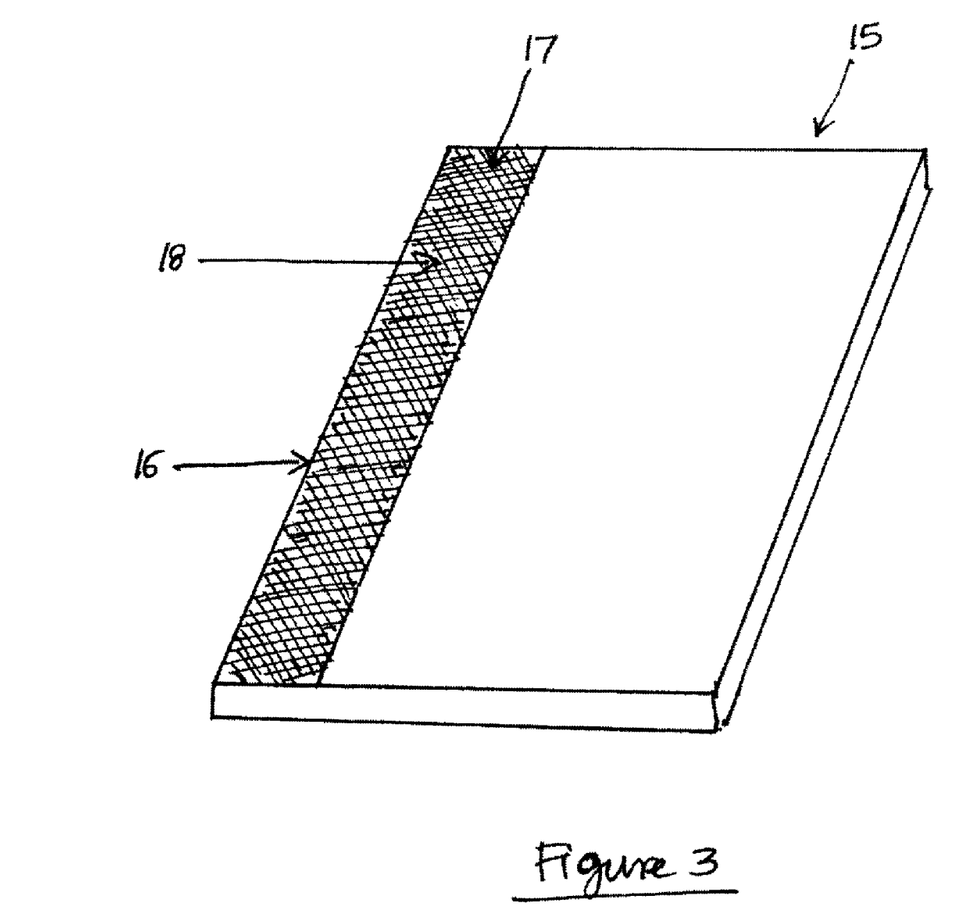
FIG. 3 is a perspective, partially cut-away, view of one embodiment of the roofing underlayment of the present invention illustrating an adhesive coating on the side lap.

FIG. 3 shows a top view of a preferred embodiment of the present invention in which the mat 15 has a side lap 16 with a factory-applied adhesive coating 17 to achieve an instant watertight bond during field installation of the underlayment. The adhesive coating 17 is protected by a siliconized release liner 18.

In order to ensure a reliable bond between adjacent sheets, it is important to employ an adhesive coating that is compatible with the asphaltic material on the bottom side of the sheet. For this application, the adhesive used could be a self-adhesive asphaltic material. Alternately the adhesive could be commercially available pressure sensitive adhesive or Styrene-Isoprene-Styrene rubber. Some of the manufacturers of pressure-sensitive adhesives are National Starch and Chemicals Co., New Jersey, and Forbo Adhesives, North Carolina. The adhesive coating is applied using commercially available equipment. The adhesive coating 17 on the side lap 16 may be in the form of one or more solid lines, swirls, or a thin coating. It is preferable to have a thin layer of this adhesive in order to provide maximum surface area of contact (between two layers) and to ensure excellent bonding. The width of the adhesive layer is between 1 inches and 5 inches, with a preferred range of between 2 inches and 4 inches in width.

For this application, a self-adhesive asphaltic material was chosen. Typical asphaltic adhesive formulations comprise asphalt flux, Styrene-Butadiene-Styrene, Styrene-Isoprene-Styrene, aromatic oil, tackifying resins, and filler. Such a formulation may contain 2 to 12% by weight of Styrene-Butadiene-Styrene elastomers, from 0 to 5% by weight of Styrene-Isoprene-Styrene elastomers, from 2 to 25% by weight of tackifying resins, from 2 to 25% by weight of aromatic oil, from 0 to 20% by weight of filler, and the remainder asphalt. More preferably, the self-adhesive formulation comprises of 2 to 8% by weight of Styrene-Butadiene-Styrene elastomers, from 0 to 3% by weight of Styrene-Isoprene-Styrene elastomers, from 2 to 15% by weight of tackifying resins, from 2 to 15% by weight of aromatic oil, from 0 to 10% by weight of filler, and the remainder asphalt. Styrene-Butadiene-Styrene and Styrene-Isoprene-Styrene elastomers are commercially available polymers sold by several companies. Some of the manufacturers of these elastomers are LCYIC of Houston, Tex., and Dynasol of Mexico. Tackifying resins are hydrocarbon structures that come in both solid and liquid form; with the liquid form being preferred for ease of processing. Some of the manufacturers of tackifying resins are Neville Chemicals, Pittsburgh, Pa., and Eastman Chemicals, Kingsport, Tenn. Filler material employed in this application could be limestone, stone dust, sand, fly ash, talc, volcanic ash, graphite, carbon black, silica or china clay. Additionally, in lieu of at least a portion of the mineral stabilizers, fire retardants materials such as calcium borate, magnesium borate, a mixture of antimony trioxide and deca bromo diphenyl oxide, etc. may be used. Generally, for self-adhesive formulations, it is preferable that the asphalt be of a softer type; i. e., has a higher penetration value. The preferred asphalt will have a softening point of between about 30 and about 50° C. as measured by ASTM D 36 test method, more preferably between about 35 and about 45° C., and a needle penetration of between about 100 and 250 dmm, as measured by ASTM D 5 test method, more preferably between about 125 and 225 dmm. Some sources of asphalt used to manufacture the self-adhesive asphaltic materials are Valero Refining Co. of San Antonio, Tex., and Bitumar of Baltimore, Md.

Positioned on the exposed surface of the asphaltic adhesive coating 17 is a release liner 18. Release liner 18 is generally a polymeric material and can be made of polyester, polypropylene, polyethylene, etc., which is further treated with a release agent such as silicone on one or both sides. Release liner 18 is applied on the asphaltic adhesive coating 17 in order to protect the asphaltic adhesive coating 17 by ensuring that the surfaces of the material do not stick together. During installation of the underlayment, the release liner 18 is removed, allowing the asphaltic material on the bottom side of the mat 15 to come into direct contact with the asphaltic adhesive coating 17 on the side lap on the top side of the mat 15. The release liner must be selected taking into consideration the following parameters: manufacturing processability, ease of releasability of the film during installation, particularly under high temperature conditions, and cost. Polyester based liners have the highest thermal stability and are preferred. The thickness of such polyester liner can range from 1.0 mil (0.025 mm) to 3 mil (0.075 mm); however a 2 mil (0.0375 mm) is preferred to achieve the desired performance characteristics at the lowest cost.

Figure 4:
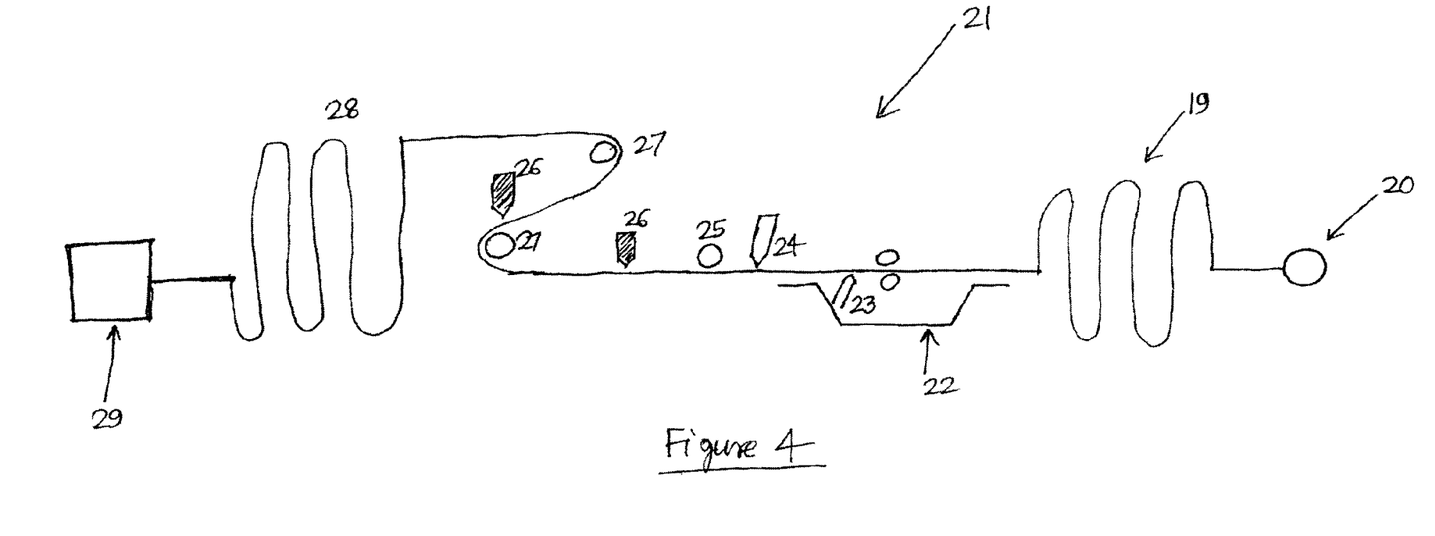
FIG. 4 is a simplified schematic view of one method of applying an adhesive coating on the side lap of a roofing underlayment material of the present invention.

FIG. 4 shows a process for manufacturing another embodiment of the inventive roofing underlayment. During the process of manufacturing the roofing underlayment of the present invention, a roll of non-woven polyester mat 19 is unwound from an unwind stand 20 at one end of the production line 21. The mat 19 is moved through the coating station 22 wherein a layer of an asphaltic material is applied to the bottom side of the mat 19. Filler material is pre-added to the asphaltic material as needed in order to achieve the desired finished roll weight. Using doctoring blades 23, the asphaltic material is scraped off so as to minimize the thickness of the same on the mat 19. Following this application, a thin layer of an asphaltic adhesive coating 17 is applied lengthwise for a width of 2 to 4 inches along one edge on the top side of the mat 19 using an adhesive applicator 24. A siliconized polyester release liner 18 of width 2 to 4 inches is placed using the release film applicator 25 along the length of the roll in such a manner as to cover the asphaltic adhesive coating 17 already applied on the mat 19. This forms a side lap 16 on the mat 19. Following this application, a LPA 26 is sprayed on the top surface of the mat 19 and on the exposed surface of the asphaltic material on the bottom side of the mat 19. Optionally the mat 19 can be run through a station where other types of parting agents or anti-sticking agents such as sand, talc, slag, etc., are applied to the surface of the layer of the asphaltic material. After this application, the mat 19 is moved over chilled drums 27 in order to be cooled. The mat 19 continues to travel through the accumulator section 28 of the production line where it continues to cool by air-cooling. The material is cut to the required length and wound into rolls at the winder 29. Rolls are stacked on pallets and stored in the warehouse for shipment.

Preferably, the end product will have the following characteristics: minimum tensile strength of 40 lbf per inch and 20 lbf per inch in the longitudinal and transversal directions, respectively, when tested according to ASTM D 1970 specification, exceptional bonding strength at the side laps, water vapor transmission value of approximately 0.10 perms when tested according to ASTM E 96 test method, retain at least 80% of its original strength after accelerated heat aged testing, retain at least 80% of its original strength after 90 days accelerated UV exposure testing, pass liquid water transmission test when tested using both staples as well as standard roofing cap nails according to ASTM D 4869 test method, instant watertightness at the side laps, unroll at high temperatures without sticking within the roll, does not exhibit any cracking under low temperature conditions, and achieves Class A fire rating when tested to the requirements of Underwriters' Laboratories E 108 test method fire testing parameters.

The hybrid underlayment of this invention has several unique design features that facilitate its use as an underlayment for asphaltic shingles, shakes, slate, cedar, tile, and roofing in addition to being used in build-up roofing (BUR) and modified bituminous roofing applications. The features and benefits of the inventive material are the following: lightweight, easy to handle, more coverage per roll, high tensile strength, good tear strength, exceptional bond strength at the side laps, excellent puncture resistance, exceptional dimensional stability, skid-resistant surfacing, excellent water shedding properties, instant watertightness at the side laps, lays flat, wrinkle free, rot and insect resistant, algae, mold and fungi resistant, pliable and flexible at low temperatures, usability in hot and cold climatic conditions, high nail pull-thru' resistance, superior UV resistance, and high wind uplift resistance. Some competitive advantages are that this material will not delaminate like prior art synthetics, offers good water shedding properties, and is significantly more durable than prior art synthetics or felt. Since the asphaltic material seals around fasteners, this material allows use of any type of fasteners to secure the sheet without jeopardizing the integrity of the material. Other advantages related to the installation are that this material can be installed with hand driven roofing nails, pneumatic nailers or cap systems. The upper surface of the sheet provides excellent traction at steep slopes; it is also well suited for use in self-adhesive applications. It is environmentally friendly, and takes less time for installation on the roof.

EXAMPLE 2

A non-woven polyester mat having a net mass per unit area of approximately 100 grams per square meter was coated with an asphaltic material having a softening point of approximately 110 degrees. The asphaltic material had the following composition: 9% by weight of saturant asphalt, 49.8% by weight of blown coating asphalt, 1.2% by weight of Styrene-Butadiene-Styrene elastomer, and 40% by weight of limestone filler. Excess asphaltic material was scraped off to leave a minimal layer of asphaltic material on the mat. Following this application, a thin layer of an asphaltic adhesive coating was applied lengthwise for a width of 2 to 4 inches along one edge on the top side of the mat. The asphaltic adhesive coating was covered by a siliconized release liner. Later LPA, Anti-Tak 40, was applied to the top surface of the polyester mat and to the exposed surface of the asphaltic material layer. The coated mat had a net mass per unit area of about 11 lbs. per 100 square feet. It was found that the roofing material made as described above, formed an excellent underlayment with watertight side laps when used in roofing applications.

Although the underlayment of the present invention, like typical underlayments, can be installed on a roof decking or other roof substrate with the non-asphaltic coated surface against the roof decking, it has been found preferable to install the underlayment such that the layer of asphaltic material is facing down, i.e., against the roof decking or other roof substrate. For one, having the asphaltic material layer against the roof decking enhances adherence of the underlayment to the decking. Additionally, in most cases where the underlayment is applied such that any asphaltic coating layer is on the exposed surface of the underlayment when installed on the decking, the underlayment is prone to "tracking" as workers walk across the installed underlayment. This is particularly true at very warm ambient temperatures or when the underlayment is subjected to direct sunlight which results in the asphaltic material softening and becoming tacky. Tracking is undesirable since as workers walk across the underlayment, the tackiness of the softened asphaltic material causes the underlayment to at least slightly stick to the shoes of the workers. This can result in a pulling upward of the underlayment stretching it and/or pulling it away from any mechanical and/or adhesive fastening systems used to fasten the underlayment to the roof substrate.

The foregoing description and examples illustrate selected embodiments of the present invention. In light thereof, variations and modifications will be suggested to one skilled in the art, all of which are in the spirit and purview of this invention.

What is claimed is:

1. A roofing membrane comprising:
    a flexible, non-woven mat having a core consisting essentially of polymeric fibers, the polymeric fibers being substantially uniformly dispersed throughout the non-woven mat and being thermally bonded together at their points of intersection by polymeric material of the fibers, said mat having a top side and a bottom side;
    a layer of an asphaltic material disposed on said bottom side of said mat, said asphaltic material comprising 2 to 18% by weight of a saturant asphalt, 40 to 58% by weight of a blown coating asphalt, 0.5 to 5% by weight of a Styrene-Butadiene-Styrene elastomer, and 20 to 65% by weight of a filler, said layer being disposed on said bottom side in an amount of from 3.75 to 6.25 lbs/100 sq. ft, of surface area of mat; and
    a liquid parting agent applied on at least said top side of said mat.

2. A method of producing a roofing membrane comprising:
    providing a flexible, non-woven mat of polymeric fibers, the polymeric fibers being substantially uniformly dispersed throughout the non-woven mat and being thermally bonded together at their points of intersection by polymeric material of the fibers, the mat having a length, a width, and a thickness, the non-woven mat having a first surface and a second surface that are each defined by the length and width of the mat;

coating the first surface of the non-woven mat with a layer of an asphaltic material comprising 2 to 18% by weight of a saturant asphalt, 40 to 58% by weight of a blown coating asphalt, 0.5 to 5% by weight of a Styrene-Butadiene-Styrene elastomer, and 20 to 60% by weight of a filler, to form a coated surface;

scraping said coated surface to leave a minimal amount of asphaltic material on said first surface and minimize the weight of said membrane, said layer being disposed on said first surface in an amount of from 3.75 to 6.25 lbs/100 sq. ft. of surface area of mat; and applying a liquid parting agent to at least said second surface of said mat to form a flexible, non-woven mat composite.

3. The method of claim 2, wherein said second surface is free of any coating of said asphaltic material.

4. A roofing membrane comprising:
a flexible, non-woven mat of polymeric fibers, the polymeric fibers being substantially uniformly dispersed throughout the non-woven mat and being thermally bonded together at their points of intersection by polymeric material of the fibers, said mat having a top side and a bottom side;
a layer of an asphaltic material disposed on said bottom side of said mat, said asphaltic material comprising 2 to 18% by weight of a saturant asphalt, 40 to 58% by weight of a blown coating asphalt, 0.5 to 5% by weight of a Styrene-Butadiene-Styrene elastomer, and 20 to 65% by weight of a filler, said top side of said mat being free of any layer of said asphaltic material, said layer being disposed on said bottom side in an amount of from 3.75 to 6.25 lbs/100 sq. ft. of surface area of mat; and
a liquid parting agent applied on at least said top side of said mat.

5. A method of producing a roofing membrane comprising:
providing a flexible, non-woven mat of polymeric fibers, the polymeric fibers being substantially uniformly dispersed throughout the non-woven mat and being thermally bonded together at their points of intersection by polymeric material of the fibers, the mat having a length, a width, and a thickness, the non-woven mat having a first surface and a second surface that are each defined by the length and width of the mat;
coating the first surface of the non-woven mat with a layer of an asphaltic material comprising 2 to 18% by weight of a saturant asphalt, 40 to 58% by weight of a blown coating asphalt, 0.5 to 5% by weight of a Styrene-Butadiene-Styrene elastomer, and 20 to 60% by weight of a filler, said layer being disposed on said first surface in an amount of from 3.75 to 6.25 lbs/100 sq. ft. of surface area of mat; and
applying a liquid parting agent to at least said second surface of said mat to form a flexible, non-woven mat composite, said second surface being free of any coating of said asphaltic material.

6. A roofing membrane comprising:
a flexible, non-woven mat of polyester, said mat having a core, a top side and a bottom side, said core consisting essentially of said polyester;
a layer of an asphaltic material disposed on said bottom side of said mat, said asphaltic material comprising 2 to 18% by weight of a saturant asphalt, 40 to 58% by weight of a blown coating asphalt, 0.5 to 5% by weight of a Styrene-Butadiene-Styrene elastomer, and 20 to 65% by weight of a filler, said layer being disposed on said bottom side in an amount of from 3.75 to 6.25 lbs/100 sq. ft. of surface area of mat; and
a liquid parting agent applied on at least said top side of said mat.

7. A method of producing a roofing membrane comprising:
providing a flexible, non-woven mat of polyester, the mat having a length, a width, and a thickness, the non-woven mat having a core, a first surface and a second surface, said first and second surfaces being defined by the length and width of the mat;
coating the first surface of the non-woven mat with a layer of an asphaltic material comprising 2 to 18% by weight of a saturant asphalt, 40 to 58% by weight of a blown coating asphalt, 0.5 to 5% by weight of a Styrene-Butadiene-Styrene elastomer, and 20 to 60% by weight of a filler to form a coated surface, said layer being disposed on said first surface in an amount of from 3.75 to 6.25 lbs/100 sq. ft. of surface area of said first surface;
scraping said coated surface to leave a minimal amount of asphaltic material on said first surface and minimize the weight of said membrane; and
applying a liquid parting agent to at least said second surface of said mat to form a flexible, non-woven mat composite.

8. The method of claim 5 or 7, wherein said second surface is free of any coating of said asphaltic material.

9. A roofing membrane comprising:
a flexible, non-woven mat of polyester, said mat having a top side and a bottom side;
a layer of an asphaltic material disposed on said bottom side of said mat, said asphaltic material comprising 2 to 18% by weight of a saturant asphalt, 40 to 58% by weight of a blown coating asphalt, 0.5 to 5% by weight of a Styrene-Butadiene-Styrene elastomer, and 20 to 65% by weight of a filler, said top side of said mat being free of any layer of said asphaltic material, said layer being disposed on said bottom side in an amount of from 3.75 to 6.25 lbs/100 sq. ft. of surface area of mat; and
a liquid parting agent applied on at least said top side of said mat.

10. A method of producing a roofing membrane comprising:
providing a flexible, non-woven mat of polyester, the mat having a length, a width, and a thickness, the non-woven mat having a core, a first surface and a second surface, said surfaces being defined by the length and width of the mat, said core consisting essentially of said polyester;
coating the first surface of the non-woven mat with a layer of an asphaltic material comprising 2 to 18% by weight of a saturant asphalt, 40 to 58% by weight of a blown coating asphalt, 0.5 to 5% by weight of a Styrene-Butadiene-Styrene elastomer, and 20 to 60% by weight of a filler, said layer being coated on said first surface in an amount of from 3.75 to 6.25 lbs/100 sq. ft. of surface area of said first surface; and
applying a liquid parting agent to at least said second surface of said mat to form a flexible, non-woven mat composite.

11. The membrane of any one of claims 1, 6 or 9 wherein said parting agent is a surfactant.

12. The method of any one of claims 2, 5 or 7 wherein said parting agent is a surfactant.

* * * * *